Sept. 5, 1967        H. J. PERRY        3,339,207
CHIN ACTUATED WELDING HOOD
Filed June 1, 1965
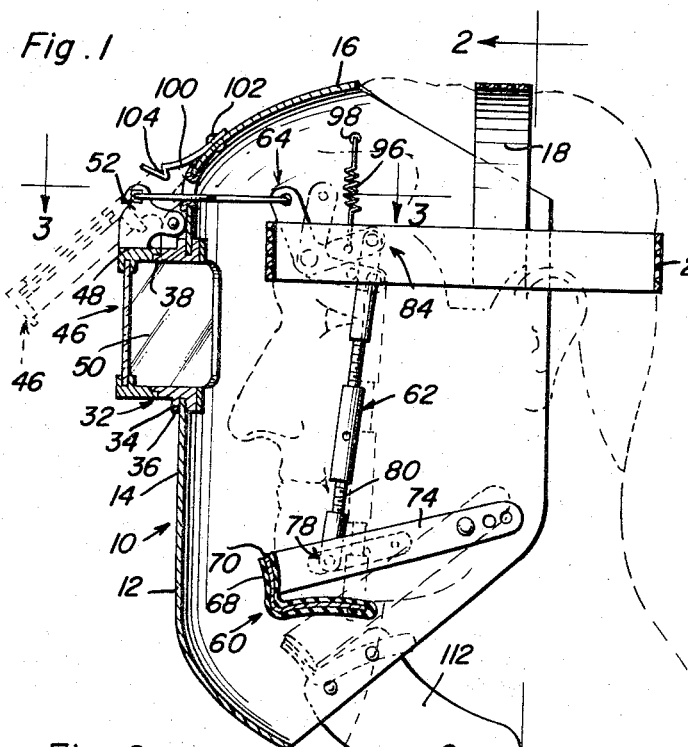
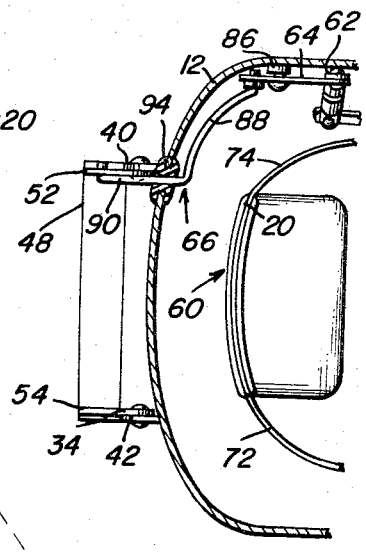
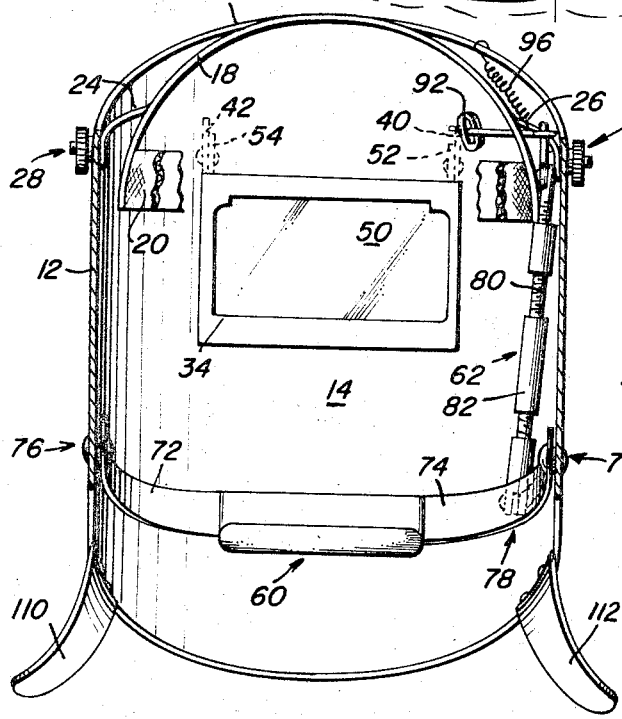
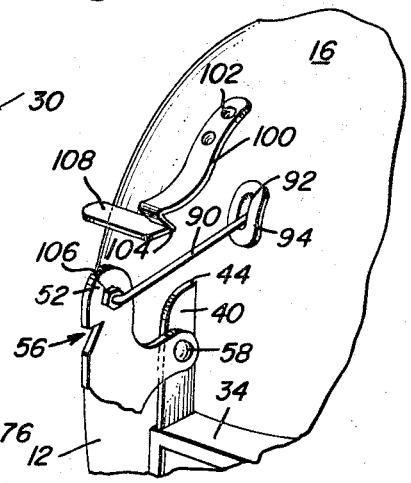
Harry J. Perry
INVENTOR.

3,339,207
CHIN ACTUATED WELDING HOOD
Harry J. Perry, St. Charles, Mo., assignor of ten percent to Allen J. Perry, St. Charles, Mo.
Filed June 1, 1965, Ser. No. 460,069
9 Claims. (Cl. 2—8)

ABSTRACT OF THE DISCLOSURE

A hood for welders having a pivotally suported eye shielding member movable from a closed position in relation to an aperture to an open position in response to pivotal movement of the jaw of the wearer of the hood. The chain engaging member is pivotally supported from the hood for movement about substantially the same axis as the jaw of the wearer and is connected with the eye shielding member by an adjustable linkage member, a pivotally supported bell crank and a connecting member interconnecting the bell crank and the eye shielding member with the connecting member extending out through an opening in the hood which is sealed. A spring catch is attached to the outer surface of the hood and includes a dog engageable with a notch in the eye shielding member and a handle forming part of the spring to enable manual release thereof with the catch coming into operation only when the chain is moved to a greater extent than normal so that the eye shielding member will be pivoted to a position beyond its normally open position so that it will be latched in the fully open position at the choice of the wearer.

---

This invention relates generally to protective devices and more particularly to a welding hood embodying a novel chin-actuated mechanism for selectively activating a front welding window including means for retaining the window in an open position.

In the past, welders have been particularly bothered by the necessity for manually raising the front window of their welding hoods or raising the whole hood itself in order to start the welding tool and/or to inspect the welding operation. This problem is acute inasmuch as protection for the welder's eyes is absolutely necessary while at the same time when the hood is on with the front window closed the welder's vision is considerably restricted. Further, if the welder must use his hands to operate the window, much lost motion and time and inconvenience is involved as the welder must set aside the welding tool in order to free his hands.

Previous devices to solve the aforementioned problems have been proposed, including chin-actuated front windows for welding hoods. However, insofar as applicant is aware, these devices uniformly involve complex linkages between each end and the window and therefore are subject to various malfunctions. Further, when welding, the welder often desires to cause the window to remain open. In the past, this could be accomplished only by use of the welder's hands.

Accordingly, it is an object of the present invention to provide a welding hood which includes a novel and simplified mechanism for raising the front window or lens and selectively retaining the window open.

Another object of the present invention is to provide a welding hood lens actuating mechanism which is chin-actuated and which includes a simple linkage between the chin and the lens.

A still further object of the present invention is to provide a welding hood having a chin-actuated window raising mechanism including means for selectively retaining the window in open position, which means is operated solely by the wearer's chin.

Briefly, the objects of this invention are accomplished by providing an eye shield for a welding hood in the form of a lens or window in combination with a chin engaging member with associated mechanism attached thereto and to the window. This mechanism includes a pivotally mounted chin strap, a linkage between the strap and an arm of a centrally pivoted, bellcrank-type lever, the other arm of which is attached to a rod which extends through the hood to an upper point on the window. Thus, movement of the chin strap will cause the lever to pivot thereby causing the rod to activate the window which is pivotally attached to the hood at a fulcrum point adjacent the rod connection. There is also provided on the exterior of the hood a leaf spring with dog for catching in a detent on the window when it is pivoted upwardly far enough, thereby retaining the window in an opened position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a vertical cross-sectional view of the welding hood including the window control comprising the present invention, the hood shown in place on a wearer;

FIGURE 2 is a vertical cross-sectional view of the welding hood comprising the present invention taken substantially along the plane of the line 2—2 of FIGURE 1;

FIGURE 3 is a horizontal cross-sectional view taken substantially along the plane of the line 3—3 of FIGURE 1; and FIGURE 4 is a partial perspective view of a portion of the window control of the present invention.

Referring now more particularly to the drawings, reference numeral 10 refers generally to the welding helmet comprising the present invention. The helmet includes an opaque hood 12 having a front wall 14 and a top wall 16, and which is adapted to be positioned on a wearer's head as shown in FIGURE 1. The hood 12 is preferably fashioned from a substantially heat resistant and fireproof material such as Fiberglas or the like. Included within the hood are head straps 18 and 20 which are preferably made of cloth or the like and which are used to retain the helmet on the wearer's head. The strap 18 fits over the top of the wearer's head and is attached to the hood 12 at 22 and by straps 24 and 26 which are attached to the head strap 18 and to the hood by conventional fastening devices 28 and 30. Head strap 20 it attached to the lower portion of head strap 18 and is adapted to fit about the wearer's head, as shown in FIGURE 1.

The front wall 14 of the hood 12 has an aperture 32 therein, the aperture being of generally rectangular shape and positioned in the front wall 14 so as to be generally in alignment with the wearer's eyes when the hood is in place. Mounted in the aperture 32 is an insert member 34, which is mounted in the aperture by being seated over the wall of the hood adjacent the edge of the aperture as at 36 and being attached to the wall. The insert 34 extends outwardly of the hood 12 and has a peripheral flange 38 extending about its periphery. Integrally formed with the insert 34 are a pair of ear members 40 and 42 which are attached to the hood 12 by conventional attaching means at 44 and which extend upwardly from insert 34 and substantially perpendicularly to wall 16.

An eye shield, generally designated at 46 is provided to cover the opening 32 in order to protect the wearer's eyes. The eye shield constitutes a frame member 48 in which is mounted a front window or lens 50. Conventially this lens is of a very heavy dark glass through which it is very difficult for the operator to see when the window is closed. Therefore, in accordance with this invention, control apparatus for the eye shield 46 is provided which enables the operator to open the eye shield by a downward movement of his jaw, as shown in FIGURE 1.

Frame member 48 is provided with parallel upstanding ear members 52 and 54 which are integrally formed therewith and which provide a hinge or pivotal attachment for the members 40 and 42. Referring to FIGURE 4, ear member 52 is illustrated as being a generally Y-shaped member having a detent portion 56 in a forward edge thereof and being pivotally mounted by a conventional pin retaining member 58 to the member 40.

The control apparatus for operating the eye shield consists of a chin rest 60, a linkage member 62, a bellcrank lever member 64 and a connecting rod 66. The chin rest 60 preferably consists of a cloth like material 68 which is folded about a center substantially rigid member 70 which preferably is of a metallic material for rigidity. The chin rest 60 is shaped to fit the wearer's chin and therefore is substantially L-shaped. Attached to the sides of the chin rest 60 are arms 72 and 74 which are curved to fit the inside of the hood and to provide room for the wearer's jaw to fit therebetween, the arms 72 and 74 being pivotally attached to the hood at their ends by conventional rivet connections 76. The linkage member 62 is attached to the arm 74 at 78 by a conventional rivet or bolt connection, which allows pivotal movement between the arm 74 and the linkage member 62. In observing FIGURES 1 and 2, it may be seen that the linkage member 62 includes a means for adjusting the length thereof thereby allowing the helmet 10 to fit various wearers by permitting the chin rest 60 to be adjusted in position. The adjustment means includes a conventional threaded bolt 80 which, in conjunction with elongated internally threaded member 82 provides a means for effectively lengthening or shortening the linkage member 62. The linkage member 62 is attached at its upper end at 84 to bellcrank lever 64 by conventional fastening means. The lever 64 is attached to the side of hood 12 at its fulcrum by conventional fastening means 86. The connecting rod 66 is attached to the other arm of the lever 64 and includes a first portion 88 which is curved to conform with the inside surface of hood 12 and a second substantially straight portion 90 which extends outwardly of the hood 12 through the elongated slot 92. An insert member 94 of Fiberglas material or the like is positioned in elongated slot 92 to provide a tight fit and a sliding surface for the portion 90 of connecting rod 66. The end of portion 90 of connecting rod 66 is connected to the upper portion of the ear member 52 by conventional fastening means.

In view of the foregoing description, it is readily apparent that the wearer by moving his jaw will cause the chin rest to move downwardly as illustrated in FIGURE 1, thereby moving the linkage member 62 downwardly, causing the bellcrank lever 62 to pivot with a clockwise rotation, pulling the connecting rod 66 inwardly through the slot 92 and thereby causing the ear member 52 to pivot about point 58 raising the eye shield 46 off of its seated position on the insert member 34. It will be appreciated that the wearer may move the eyeshield to any desired position merely by moving his jaw, including leaving it closed or seated on the insert 34 by refraining from moving his jaw. Attached to the lever 64 is a small coil spring 96 which is attached at its other end to the hole 98 in the hood 12, the spring 96 causing the chin rest 60 to move upwardly when the wearer's jaw is moved upwardly.

Attached to the hood above the eye shield and slot described above is a catch member 100 which is attached to the hood by rivets 102. The catch member constitutes a leaf spring which is readily flexible and which includes a dog 104 formed in the lower portion thereof. The dog 104 is positioned to engage the detent 56 in ear member 52 when the wearer moves his jaw sharply downwardly, thereby causing the eye shield 46 to move to an extreme upward position as shown in FIGURE 1. Thus it may be observed that when the eye shield 46 is moved upwardly to this position, the dog portion 104 of the leaf spring 100 will engage in the detent 56 by sliding upwardly over the edge 106 of the ear member 52 and due to its resiliency will remain seated in the detent thereby causing the eye shield to remain open. A finger release portion 108 is provided on the leaf spring catch 100 thereby allowing the wearer to move the dog portion 104 upwardly out of the detent 56 thereby allowing the eye shield 46 to be moved back into seated position on insert 34.

Provided at the bottom of the hood 12 are shoulder rest members 110 and 112 which are attached to the bottom portion of the hood by conventional rivet attaching means and which extend outwardly and laterally of the hood 12 as illustrated in FIGURES 1 and 2 thereby providing a bottom support for the hood on the wearer's shoulders when the hood is in place on the wearer.

In view of the above description it will be appreciated that the eye shield control apparatus of the present invention allows the wearer of the welding hood to open the eye shield 46 merely by moving his jaw and either than allow it to close or by a sharp downward movement of his jaw cause it to remain in open position awaiting a further release movement by the operator to fall to closed position. Thus, the welder's helmet of the present invention allows substantially complete freedom of action by the welder during all welding operations and provides an eye shield or cover for the front of the welder's helmet which provides substantial safety in operation and use of the helmet.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a protective hood including a frontwardly directed opening for allowing a wearer to see out of the hood, the improvement comprising a chin rest adapted for engagement with the wearer's chin, arm means, means pivotally mounting said arm means on said hood adjacent the rear edges of the hood for pivotal movement about substantially the same axis as the jaw of a wearer, said arm means supporting said chin rest for pivotal movement in response to movement of the wearer's jaw and about generally the same axis, motion transmitting means operatively connected to said chin rest, eye shielding means, means hingedly mounting said eye shielding means on the exterior of said hood adjacent said opening and adapted to selectively close said opening, said motion transmitting means being in engagement with said eye shielding means exteriorly of the hood whereby movement of the wearer's jaw is transmitted to said eye shielding means, said eye shielding means including detent means thereon, catch means, means mounting said catch means on the hood in position for releasable engagement with said detent means whereby said eye shielding means will be retained in open position when said catch means is in engagement with said detent means.

2. The improvement of claim 1 wherein said motion transmitting means comprises a linkage member pivotally connected at one end to said arm means, lever means, means pivotally mounting the lever means on said hood, said mounting means for the lever means providing a fulcrum point for said lever means, said linkage member connected to one end of said lever means, and connecting rod means extending through the front of the hood and connected between the other end of said lever means and said eye shielding means whereby downward movement of the wearer's jaw will cause downward pivotal movement of said one end of said lever means thereby moving said connecting rod means and causing said eye shielding means to open.

3. The improvement of claim 2 wherein said linkage member is adjustable longitudinally thereby allowing said chin rest to be adjusted for fitting various wearers.

4. The improvement of claim 1 wherein said hood includes insert means in said opening forming the mounting means for said eye shield means, said insert means providing a seat for said eye shielding means when said eye shielding means is in closed position.

5. The improvement of claim 4 wherein said eye shielding means includes a frame member adapted for engagement fit on said insert means and lens means within said frame member for protecting the wearer's eyes when said frame member and insert means are so engaged.

6. An eyeshield control in combination with a welding helmet having an opaque head enclosing hood and an upright apertured front wall, a generally rectangular frame member, means securing said frame member in said aperture with said frame member extending outwardly of said hood, an eye shield member, means hingedly mounting said eye shield member on the exterior surface of said front wall above said aperture, said eye shield member including a peripheral flange engagedly seated on said frame member, said eye shielding member being movable from a closed position to an open position, said control including a chin engaging member, means pivotally mounting said chin engaging member within said hood, lever means, means pivotally mounting said lever means at its fulcrum in said hood, a linkage member connecting said chin engaging member and said lever means, a connecting rod extending through the hood above the aperture and connected at one end to said lever means and at the other end to said eye shield member whereby movement of a wearer's jaw will move said chin engaging member thereby pivoting said lever means and moving said eye shielding member from said closed position to said open position.

7. The apparatus of claim 6 wherein said eye shielding member includes detent means and said hood includes catch means positioned thereon for engagement with said detent means when said eye shielding member is opened by said chin engaging member.

8. The apparatus of claim 7 wherein said catch means comprises a leaf spring, means attaching said spring exteriorly on said hood above said aperture, said spring including a dog for engagement in said detent means and finger release means for releasing said dog from said detent means, said detent means being in the form of a notch in the eye shielding member.

9. In a protective helmet for welders having an opaque hood adapted to be located forwardly of the face and provided with a window adapted to be located in alignment with the eyes, an eye shielding member disposed exterior of the hood, means mounting the eye shielding member from the hood for movement between a closed and an open position, an operating rod connected to the eye shielding member exteriorly of the hood and extending interiorly of the hood through an opening formed threin, a linkage mechanism disposed interiorly of the hood and operatively connected to the connecting rod, means mounting the linkage mechanism on the hood, a chin engaging member, means mounting the chin engaging member on said hood for arcuate movement generally in the same path as the chin of a wearer, said linkage mechanism being operatively connected to said chin engaging member, the movement of the chin engaging member being imparted to the eye shielding member through the linkage mechanism and connecting rod for moving the eye shielding member from a closed position to an open position when the chin of the wearer is moved downwardly, and latch means disposed exteriorly of the hood, means mounting the latch means on the hood in association with the eye shielding member to releasably retain the eye shielding member in a position beyond its normally open position caused by movement of the chin of the wearer beyond a normal open position.

References Cited
UNITED STATES PATENTS

| | | | |
|---|---|---|---|
| 1,800,623 | 4/1931 | Greene | 2—8 |
| 2,190,074 | 2/1940 | Locher | 2—8 |
| 2,270,028 | 1/1942 | Anderson | 2—8 |
| 2,352,007 | 1/1944 | Rickert | 2—8 |
| 2,569,715 | 10/1951 | Green | 2—8 |
| 3,086,212 | 4/1963 | Hill | 2—8 |
| 3,086,213 | 4/1963 | Crozat et al. | 2—8 |
| 3,095,575 | 7/1963 | Radov | 2—8 |
| 3,225,356 | 12/1965 | Burmeister | 2—8 |

JORDAN FRANKLIN, *Primary Examiner.*

J. R. BOLER, *Assistant Examiner.*